(12) United States Patent
Sullivan et al.

(10) Patent No.: US 9,832,828 B2
(45) Date of Patent: *Nov. 28, 2017

(54) CIRCUITS AND METHODS FOR REDUCING FLICKER IN AN LED LIGHT SOURCE

(71) Applicant: Texas Instruments Incorporated, Dallas, TX (US)

(72) Inventors: Timothy Roy Sullivan, Longmont, CO (US); Daniel Ross Herrington, Fort Collins, CO (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/798,126

(22) Filed: Jul. 13, 2015

(65) Prior Publication Data

US 2016/0014863 A1    Jan. 14, 2016

Related U.S. Application Data

(63) Continuation of application No. 13/667,964, filed on Nov. 2, 2012, now Pat. No. 9,084,319.

(51) Int. Cl.
    *H05B 33/08* (2006.01)
(52) U.S. Cl.
    CPC ..... *H05B 33/0845* (2013.01); *H05B 33/0815* (2013.01); *H05B 33/0848* (2013.01)
(58) Field of Classification Search
    CPC .................. H05B 33/0845; H05B 33/0815
    See application file for complete search history.

(56) References Cited

U.S. PATENT DOCUMENTS

| 7,902,769 B2 * | 3/2011 | Shteynberg | ........ H05B 33/0815 |
| | | | 315/291 |
| 8,513,894 B2 | 8/2013 | Huang et al. | |
| 8,791,653 B2 | 7/2014 | Wendt | |
| 2005/0237005 A1 * | 10/2005 | Maxik | ................ H05B 33/0818 |
| | | | 315/247 |
| 2009/0184662 A1 * | 7/2009 | Given | ................ H05B 33/0815 |
| | | | 315/294 |

(Continued)

FOREIGN PATENT DOCUMENTS

| CN | 101207961 A | 6/2008 |
| CN | 101909391 A | 12/2010 |

(Continued)

OTHER PUBLICATIONS

PCT Search Report for PCT/US13/68288, dated Feb. 6, 2014 (1 page).

(Continued)

*Primary Examiner* — Douglas W Owens
*Assistant Examiner* — Pedro C Fernandez
(74) *Attorney, Agent, or Firm* — Lawrence J. Bassuk; Charles A. Brill; Frank D. Cimino

(57) ABSTRACT

Method and circuits for balancing a first waveform used to drive an LED are disclosed herein. The first waveform has a first cycle with a first amplitude and a second cycle with a second amplitude. An embodiment of the method includes adjusting the first amplitude of the first cycle to match the second amplitude of the second cycle, the result being a second waveform. The LED is driven with the second waveform.

20 Claims, 3 Drawing Sheets

(56) References Cited

U.S. PATENT DOCUMENTS

| | | | |
|---|---|---|---|
| 2010/0295460 A1 | 11/2010 | Lin et al. | |
| 2011/0227485 A1 | 9/2011 | Huynh | |
| 2011/0227489 A1* | 9/2011 | Huynh | H05B 33/083 315/185 R |
| 2012/0146525 A1 | 6/2012 | Hui et al. | |
| 2012/0153833 A1 | 6/2012 | Mikani et al. | |
| 2012/0153836 A1 | 6/2012 | Shimizu | |
| 2013/0334980 A1* | 12/2013 | Zhou | H05B 33/0845 315/250 |
| 2014/0009085 A1* | 1/2014 | Veskovic | H05B 33/08 315/307 |
| 2014/0159595 A1* | 6/2014 | Sutardja | H05B 33/0827 315/192 |
| 2014/0203734 A1 | 7/2014 | Wendt | |

FOREIGN PATENT DOCUMENTS

| | | |
|---|---|---|
| CN | 102143638 A | 8/2011 |
| JP | 2010272840 A | 12/2010 |
| JP | 2011510475 A | 3/2011 |
| JP | 2011522358 A | 7/2011 |
| JP | 2012109266 A | 6/2012 |
| JP | 2012134001 A | 7/2012 |
| WO | WO2012061769 A2 | 5/2012 |

OTHER PUBLICATIONS

Chinese Office Action dated Jun. 27, 2016 (4 pages).
Search Report, dated Sep. 8, 2017.

\* cited by examiner

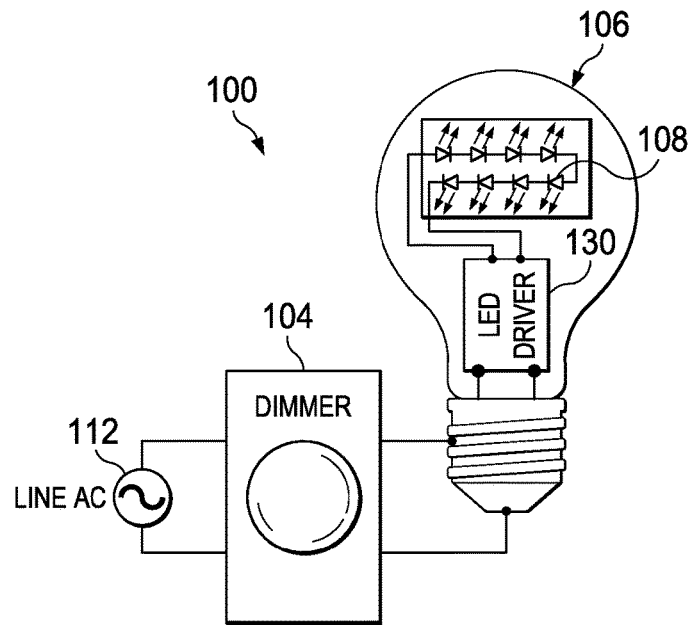
FIG. 1
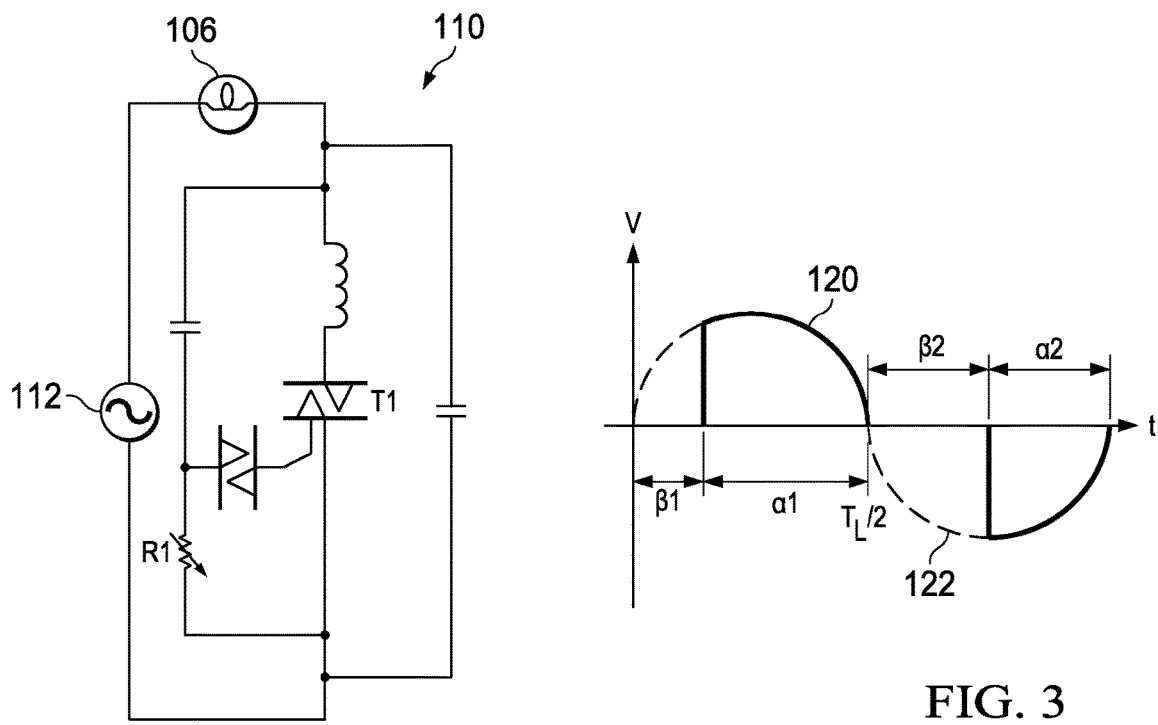
FIG. 2
FIG. 3

US 9,832,828 B2

CIRCUITS AND METHODS FOR REDUCING FLICKER IN AN LED LIGHT SOURCE

CROSS REFERENCE TO RELATED APPLICATION(S)

The present application is a continuation of U.S. Non-provisional patent application Ser. No. 13/667,964, filed Nov. 2, 2012 (U.S. Pat. No. 9,084,319), which is hereby incorporated by reference for all purposes.

BACKGROUND

Some people are replacing incandescent light bulbs with LED bulbs. The LED bulbs are direct replacements for incandescent lights, so a user simply unscrews an incandescent bulb from a socket and replaces it with an LED bulb. Many incandescent bulbs are operated by the use of a dimmer that controls the intensity of light emitted by an incandescent bulb. Most dimmers work by clipping the AC line voltage supplied to the incandescent bulb by the use of a triac. For example, the dimmer clips the positive and negative portions of the AC sinusoidal wave that is supplying power to the incandescent bulb. Because of the construction and inherent operating principles of the triac, the positive and negative portions of the AC voltage that are clipped by the triac are not equal.

The intensity of light emitted by an incandescent and an LED bulb is proportional to the current driving the bulb. Therefore, when the positive and negative portions of the sinusoidal wave driving the bulbs is clipped differently, the driving current will have a ripple. Incandescent lights have a very long time constant, meaning that they will glow for a period after power is removed. Therefore, a user is not likely to notice the inherent ripple of a dimmed incandescent light bulb. However, LEDs emit light based on current flow through a P-N junction and therefore do not glow or have a very short period in which they glow. As a consequence, the difference in conduction angles caused by the triac causes a noticeable and unpleasant flicker.

SUMMARY

Method and circuits for balancing a first waveform used to drive an LED are disclosed herein. The first waveform has a first cycle with a first amplitude and a second cycle with a second amplitude. An embodiment of the method includes adjusting the first amplitude of the first cycle to match the second amplitude of the second cycle, the result being a second waveform. The LED is driven with the second waveform.

BRIEF DESCRIPTION OF THE DRAWINGS

FIG. 1 is a schematic illustration of an LED lighting system using a dimmer.

FIG. 2 is a schematic illustration of an embodiment of the circuit within the dimmer of FIG. 1.

FIG. 3 is a graph depicting the voltage to the bulb of FIG. 1 as the dimmer is activated.

DETAILED DESCRIPTION

Figure 4:
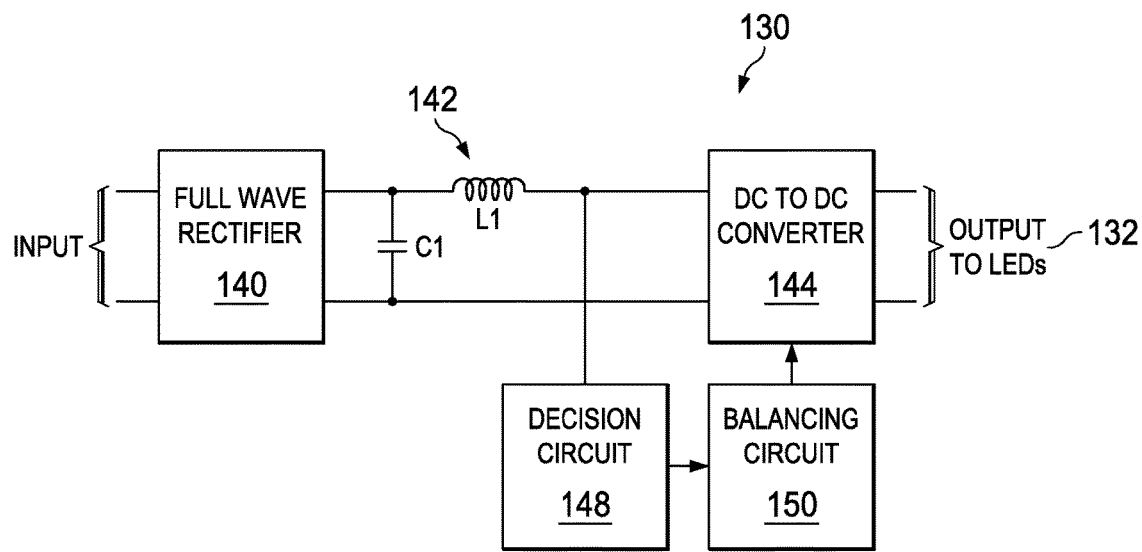
FIG. 4 is a block diagram of an embodiment of the LED driver of FIG. 1.

Circuits and methods that balance LED (light-emitting diode) driving currents are disclosed herein. Reference is made to FIG. 1, which is a schematic diagram of an LED lighting system 100 using a dimmer 104. The dimmer 104 is used to dim a solid state light (SSL) bulb 106. In the embodiments described herein, the SSL bulb 106 is an LED bulb, wherein the source of light emitted by the bulb 106 is generated by LEDs 108. LED bulbs differ somewhat from incandescent light bulbs that get hot and glow, even for a short period after power is removed from the incandescent bulbs. LEDs, on the other hand, use a P-N junction to emit light, which stops instantaneously upon removal of the power source to the LEDs. Therefore, the LED bulbs have a much shorter time constant than incandescent bulbs, which makes them difficult to dim. More specifically, the very short time constants make the LEDs sensitive to their driving currents. For example, a ripple in the driving current may cause a flicker that is noticeable by a user, wherein the same ripple driving an incandescent bulb does not produce a noticeable flicker.

Most users of LED bulbs want to simply replace an incandescent bulb with an LED bulb and use an existing dimmer that was used with the incandescent bulb. However, these dimmers were typically made for devices such as incandescent bulbs or ceiling fans that are not susceptible to small ripple currents and therefore the output currents of these dimmers have some imbalance between the positive and negative portions of their output sinusoid signals. This imbalance may cause flicker in the light emitted by the LED bulbs, which may be noticeable. The circuits and methods described herein reduce the effects of the imbalance caused by the dimmer 104, which reduces the flicker in the light emitted by the bulb 106.

Additional reference is made to FIG. 2, which is a schematic diagram of an embodiment of a circuit 110 located within the dimmer 104. The circuit 110 is a conventional dimming circuit that uses a triac T1 for dimming purposes. It is noted that the dimmer 104, and thus the circuit 110 are connected in series with the bulb 106 and an AC line voltage source 112 (referred to herein as the line voltage 112). The line voltage 112, for example, may be 110v at 60 Hz. The triac T1 acts like a switch and closes the circuit 100 during portions of the sinusoidal line voltage 112. A variable resistor R1 determines the voltage at which the triac T1 closes, which is sometimes referred to as the firing angle. By adjusting the variable resistor R1, the conduction angle of the circuit 100 can be varied, which varies the voltage and current flow to the bulb 106. There are many different dimmer circuits, but they produce the same outcome of opening and closing the circuit 100 during specific periods of the sinusoidal line voltage.

The conduction angle is shown by the graph of FIG. 3, which is an example of the current flow through the circuit 100. The line voltage 112 supplies an AC sinusoidal voltage shown by the solid and dashed lines of FIG. 3. For reference, one cycle of the sinusoidal voltage is shown and has a positive phase 120 of 180 degrees and a negative phase 122 of 180 degrees. The triac T1 in the circuit 110 prevents current from flowing through the circuit 110, and thus, the bulb 106, until the voltage has reached a specific level determined by the variable resistor R1. By stopping the current flow at different angles, the circuit 110 maintains an AC current to the bulb 106, but the amount of current varies.

An example of the voltage supplied to the bulb 106 is shown by the solid line in FIG. 3, which may also described the current supplied to the bulb 106. During the positive phase 120, current flows through the bulb 104 during a period of a conduction angle $\alpha 1$. Current does not flow during an off period represented by an angle $\beta 1$. It is noted that sum of the angles $\alpha 1$ and 131 add up to the positive phase 120 of 180 degrees. During the negative phase 122, current flows through the bulb 104 during a period of a conduction angle $\alpha 2$. Current does not flow during an off period represented by an angle of $\beta 2$. The sum of the angles $\alpha 2$ and $\beta 2$ add to the negative phase 122 of 180 degrees. In the embodiments described herein, the conduction angle $\alpha 1$ is not necessarily equal to the conduction angle $\alpha 2$. The unequal conduction angles $\alpha 2$, $\beta 2$ represent the imbalance described above.

Referring again to FIG. 1, an LED driver 130 within the bulb 106 uses the voltage shown in FIG. 3 to drive the LEDs 108 within the bulb 106. A block diagram of an embodiment of the LED driver 130 is shown in FIG. 4. Several elements of the LED driver 130 are described as being individual circuits. It is noted that they all or some of them may be located on a single circuit. The LED driver 130 has an input that is connectable to the circuit 100. The input is connected to a full wave rectifier 140. The full wave rectifier 140 has an output that may be connected to a filter 142 consisting of a capacitor C1 and an inductor L1. It is noted that the filter 142 may be any number and configuration of components that smooth the output of the full wave rectifier 140. In some embodiments, the filter 142 is not used.

The output of the filter 142 is connected to both a DC to DC converter 144 and a decision circuit 148. The DC to DC converter 144 receives the filtered voltage from the filter 142 and steps it up or down as described below. It is noted that the current output from the filter 142 is substantially in phase with the voltage output from the filter 142 when a load is present. The decision circuit 148 monitors the voltage output from the filter 144 to determine whether the DC to DC converter 144 needs to step the output current up or down. For example, the decision circuit 148 may analyze the AC component of the filtered signal to determine whether a balancing circuit 150 needs to balance the current.

The decision circuit 148 has an output that is connected to the balancing circuit 150. The balancing circuit 150 has an output that is connected to the DC to DC converter 144 so that the balancing circuit 150 controls the level to which the current output from the filter 142 is stepped up or down or is otherwise adjusted by the DC to DC converter 144. For example, the DC to DC converter 144 may attenuate or amplify the DC component of the current output from the filter 142. The balancing circuit 150 may be digital circuits, software, firmware, or other devices that analyze the output of the voltage analyzer 148 and cause the DC to DC converter 144 to adjust the output voltage, which will inherently adjust the output current, based on the input from the balancing circuit 150.

Figure 5:
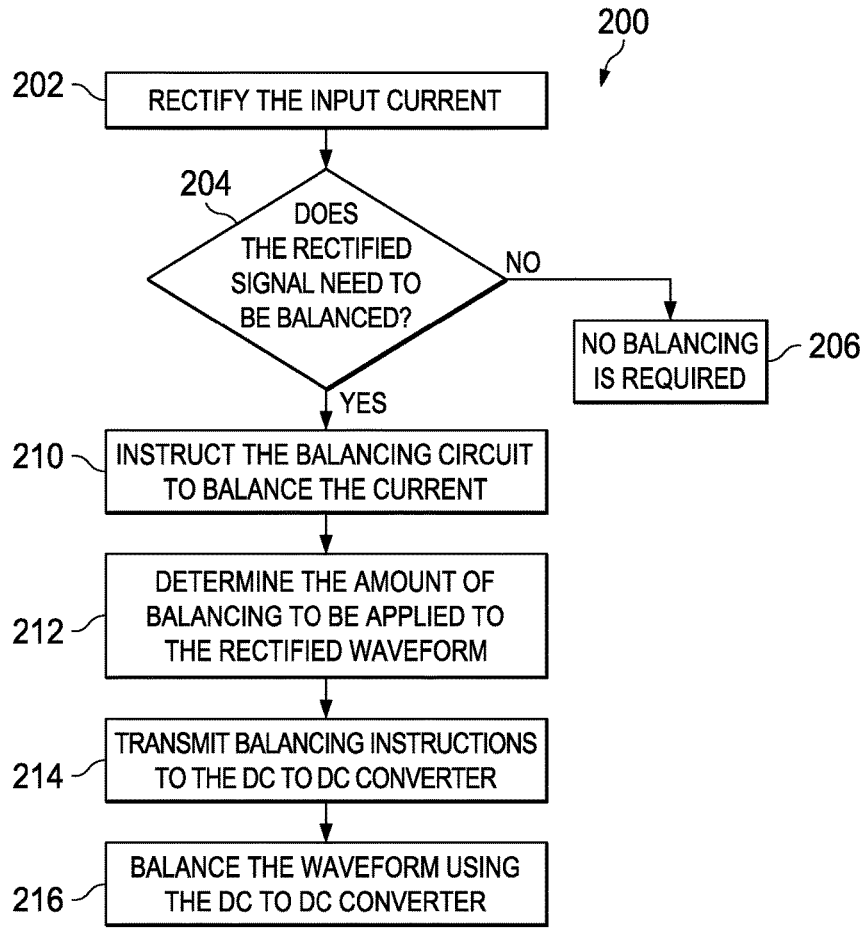
FIG. 5 is a flow chart describing the operation of the LED driver of FIG. 4
Figure 6:
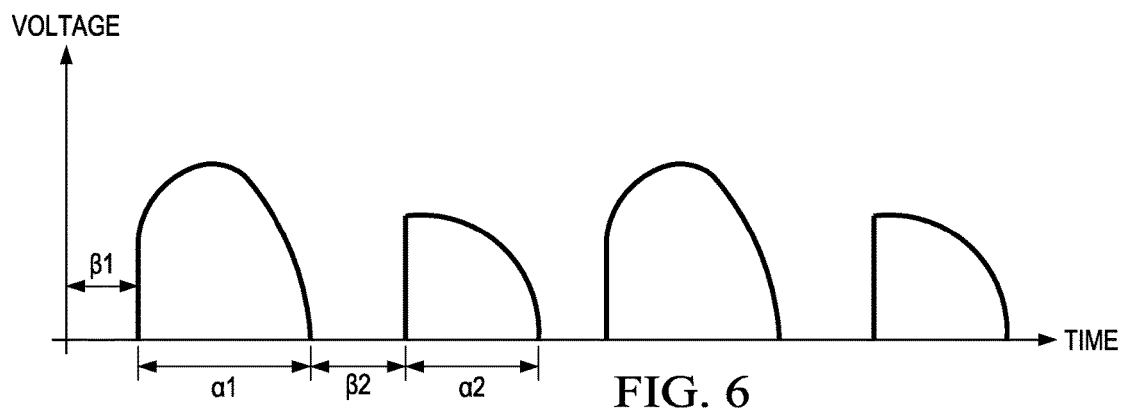
FIG. 6 is a graph of the rectified voltage input to DC to DC converter of FIG. 4.

Having described the LED driver 130, its operation will now be described with additional reference to the flowchart 200 of FIG. 5. The current shown in FIG. 3 is present at the bulb 106 and at the input of the full wave rectifier 140. The full wave rectifier 140 rectifies the input current in a conventional manner as described in step 202 of the flow chart 200. The full wave rectifier 140 outputs a signal as shown in FIG. 6, which is the rectified signal of two cycles from the line voltage 112. As shown, there is a higher and longer voltage during the conduction angle $\alpha 1$ than during the conduction angle $\alpha 2$.

Figure 7:
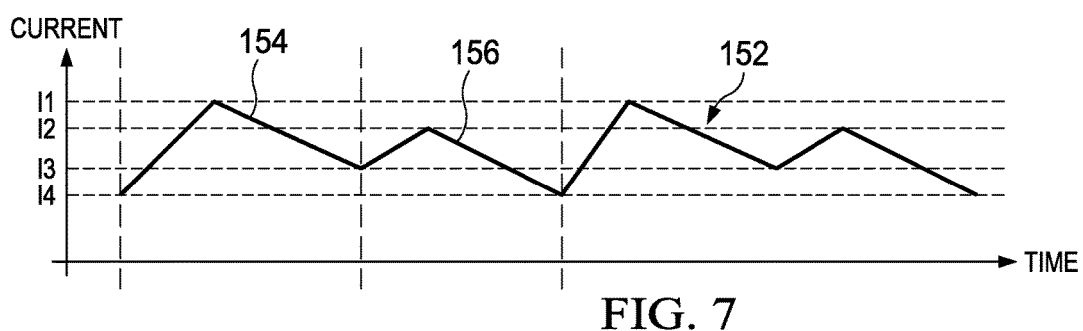
FIG. 7 is a graph showing the current at the output of the filter of FIG. 4.

The signal of FIG. 6 is filtered by the filter 142 to yield a signal 152 as shown in FIG. 7. The signal 152 has a first cycle 154 that is the result of the conduction angle $\alpha 1$ and a second cycle 156 that is a result of the conduction angle $\alpha 2$. The cycle 154 resulting from the conduction angle $\alpha 1$ peaks at a current I1 or may be referred to as having an amplitude of I1. The cycle 156 resulting from the conduction angle $\alpha 2$ peaks at a current I2 or may be referred to as having an amplitude I2 wherein the current I1 is greater than the current I2. The cycle 154 drops to a current I3 and the cycle 156 drops to a current I4, wherein the current I3 is greater than the current I4. In addition, the cycle 154 is longer than the cycle 156. The points represented by the currents I3 and I4 are sometimes referred to as troughs. For reference purposes, these points may be referenced as or related to amplitudes of the cycles 154, 156 in some circumstances herein.

The decision circuit 148 monitors the waveform 152 to determine if it is required to be balanced as described in the decision block 204 of the flowchart 200. For example, the decision circuit 148 may compare the peak current I1 to the peak current I2. The measuring may be accomplished by measuring a first peak current and then searching for the next peak and measuring it. By such measurement, the current values of two adjacent peaks are measured. If the difference is not greater than a predetermined value, the resulting flicker output from the LEDs 108, FIG. 1, may not be noticeable and no balancing may be performed as shown in block 206. If the difference is greater than a predetermined value, the decision circuit 148 may instruct the balancing circuit 148 to balance the current as shown in block 210.

In the embodiment described herein, the waveform 152 is out of balance because the peak current I1 of the cycle 154 is not within a predetermined value of the peak current I2 of the cycle 156. If such a waveform was used to drive the LEDs 108, the LEDs 108 would flicker to where the flicker could be noticeable to a user. As shown, the flicker would occur at the same frequency as the frequency of the line voltage 112. Therefore, if the line voltage 112 operates at a frequency of 60 Hz, the flicker from the rectified and dimmed signal would also have a frequency of 60 Hz, which may be noticeable by the user, especially if the LEDs 108 are operating in dim conditions. In bright conditions, phosphor and other chemicals in the LEDs 108 may glow for a short period after current to the LEDs 108 is removed. This glow will reduce the noticeable flicker in the light. However, the glow will not be achieved in dim lighting conditions, which makes the flicker in dim conditions more noticeable.

Balancing the waveform 152 involves determining the amount of adjusting that is required to be applied to the waveform 152 as described at step 212. The balancing involves measuring or analyzing the waveform 152 at the output of the filter 142, which may be performed by the decision circuit 148. The decision circuit 148 may determine the currents of the peaks and troughs in the waveform 152 and their location in time. This information is transmitted to the balancing circuit 150, which determines how to balance the waveform 152. For example, the peak current I1 of the cycle 154 may be lowered to the level of the peak current I2 of the cycle 156. The waveforms 154, 156 may also be adjusted to be the same length.

Information or control signals for achieving the balancing of the waveform 152 are transmitted to the DC to DC converter 144 as described in step 214. The instructions cause the DC to DC converter 144 to balance the waveform 152 as described in step 216. The instructions may cause the DC to DC converter 144 to lower the output current during periods corresponding to the conduction angle α1. Accordingly, the peak current during the conduction angle α1 may be lowered to the current level I2, which corresponds to the peak current during the period of the conduction angle α2. For example, the DC to DC converter 144 may attenuate or amplify the DC component of the waveform 152.

Figure 8:
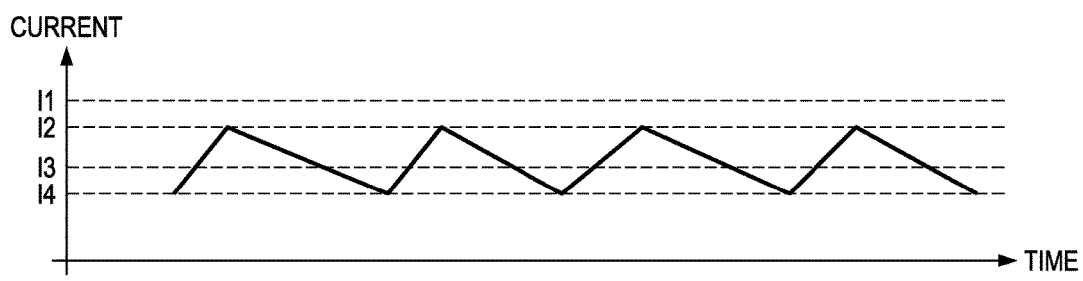
FIG. 8 is a graph showing the current at the output of the DC to DC converter of FIG. 4.

The result of the balancing is that the waveform 152 is converted to the waveform 160 shown in FIG. 8. As shown, the peak currents are the same, which reduces the flicker that would otherwise occur at the frequency of the line voltage 112. The waveform 160 has a ripple, but it is balanced. Therefore, any flicker emitted by the LEDs 108, FIG. 1, will flicker at a frequency of twice the frequency of the line voltage 112. For example, if the line voltage is operating at a frequency of 60 Hz, the flicker emitted by the LEDs 108 will be at a frequency of 120 Hz, which is less noticeable than a flicker of 60 Hz.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of balancing a first waveform used to drive an LED, the first waveform having a first cycle with a first amplitude and a second cycle with a second amplitude, the method comprising:
    adjusting the first amplitude of the first cycle to match the second amplitude of the second cycle, the result being a second waveform having a third cycle with a third amplitude matching the second amplitude and a fourth cycle with a fourth amplitude matching the second amplitude; and
    driving the LED with the second waveform.

2. The method of claim 1, wherein the first amplitude is greater than the second amplitude and wherein the adjusting comprises attenuating the first cycle so that the first amplitude matches the second amplitude.

3. The method of claim 1 and further comprising determining if the first amplitude is within a predetermined value of the second amplitude and skipping the adjusting if the first amplitude is within a predetermined value of the second amplitude.

4. The method of claim 1, wherein the first waveform is rectified from a sinusoidal waveform being attenuated by a first conduction angle during the first cycle and a second conduction angle during the second cycle.

5. The method of claim 1, wherein the first cycle has a DC component and wherein the adjusting is performed by changing the DC component of the first cycle.

6. The method of claim 5, wherein the adjusting is performed by a DC to DC converter.

7. The method of claim 1, wherein the first amplitude is less than the second amplitude and wherein the adjusting comprises amplifying the first cycle so that the first amplitude matches the second amplitude.

8. The method of claim 1, wherein the first cycle has a peak associated therewith, the second cycle has a peak associated therewith, and wherein the amplitudes are based on the peaks.

9. The method of claim 1, wherein the first cycle has a trough associated therewith, the second cycle has a trough associated therewith, and wherein the amplitudes are based on the troughs.

10. An LED driver comprising:
    an input for receiving an input current, the input current having a first cycle having a first conduction angle and a second cycle having a second conduction angle;
    a decision circuit, wherein the decision circuit determines when the amplitude of the first cycle is within a predetermined value of the amplitude of the second cycle; and
    a converter, wherein the converter adjusts the amplitude of the first cycle to be substantially equal to the amplitude of the second cycle when the amplitude of the first cycle is not within the predetermined value of the amplitude of the second cycle, the converter driving the LED with both the adjusted first cycle and the second cycle.

11. The LED driver of claim 10 and further comprising a rectifier connected to the input, wherein the rectifier rectifies the input current, and wherein the decision circuit acts on the rectified current.

12. The LED driver of claim 10, wherein the converter is a DC to DC converter having outputs coupled to the LED.

13. The LED driver of claim 10, wherein the first cycle has a DC component and wherein the converter adjusts the DC component of the first cycle.

14. The LED driver of claim 10 and further comprising a balancing circuit, wherein the balancing circuit receives data from the decision circuit indicating that the first cycle needs to be adjusted and outputs data to the converter as to the amount to adjust the first cycle.

15. The LED driver of claim 14, wherein the converter, balancing circuit, and decision circuit are integrated into a single circuit.

16. The LED driver of claim 10, wherein the decision circuit determines whether the amplitude of the first cycle is lower than the amplitude of the second cycle and adjusts the cycle with the greater of the two amplitudes to the lower amplitude.

17. The LED driver of claim 10, wherein the first cycle has a peak associated therewith, the second cycle has a peak associated therewith, and wherein the amplitudes are based on the peaks.

18. The LED driver of claim 10, wherein the first cycle has a trough associated therewith, the second cycle has a trough associated therewith, and wherein the amplitudes are based on the troughs.

19. The LED driver of claim 10, wherein the LED driver is located in a bulb.

20. A method of balancing a first current waveform used to drive an LED, the waveform having a first cycle with a first amplitude and a second cycle with a second amplitude, the method comprising:
    rectifying the first current waveform;
    determining whether the first amplitude and the second amplitude have a difference that is greater than a predetermined value;
    determining the amount that the greater of the first amplitude and the second amplitude has to be attenuated when the difference between the first amplitude and the second amplitude is greater than a predetermined value;
    adjusting the greater of the first amplitude and the second amplitude to the lower of the first amplitude and the second amplitude, the resulting waveform being a second current waveform; and driving the LED with the lower of the first amplitude and the second amplitude of the second current waveform.

* * * * *